United States Patent [19]

Goodlove

[11] Patent Number: 4,555,125

[45] Date of Patent: Nov. 26, 1985

[54] SAFETY HITCH PIN

[76] Inventor: Gerol L. Goodlove, R.R. #1, Palo, Iowa 52324

[21] Appl. No.: 507,479

[22] Filed: Jun. 24, 1983

[51] Int. Cl.$^4$ ............................................. B60D 1/00
[52] U.S. Cl. ..................................... 280/515; 403/157
[58] Field of Search ...................... 280/508, 509, 515; 403/157, 149, 161; 292/145, 153

[56] References Cited

U.S. PATENT DOCUMENTS

| | | | |
|---|---|---|---|
| 432,735 | 7/1890 | Helm | 403/157 |
| 2,367,874 | 1/1945 | Kelley | 280/515 |
| 2,483,111 | 9/1949 | Spillman | 280/515 |
| 3,011,801 | 12/1961 | Neumann | 280/515 |
| 3,197,239 | 7/1965 | Jezek, Jr. | 280/515 |
| 3,554,587 | 7/1968 | Baker | 403/157 |
| 3,825,284 | 7/1974 | Behrle | 280/515 |
| 3,844,663 | 10/1974 | Prette | 403/157 |
| 3,865,407 | 2/1975 | Klassen | 280/515 |
| 4,087,112 | 5/1978 | Lee, Jr. | 280/515 |
| 4,102,124 | 7/1978 | Swager | 59/86 |
| 4,234,990 | 11/1980 | Colburn | 9/310 A |

*Primary Examiner*—Richard A. Bertsch
*Attorney, Agent, or Firm*—James C. Nemmers

[57] ABSTRACT

A self-locking, safety hitch pin for connecting the tongue of a farm implement to the drawbar of a towing vehicle, such as a tractor. The pin has a handle pivotally connected to it at its upper end, the handle extending to the lower end of the pin to prevent it from inadvertently falling out of the connection. A spring-biased locking member is combined with the upper end of the handle and pin to automatically lock the handle in place when the handle is lowered to a closed position.

4 Claims, 4 Drawing Figures

U.S. Patent    Nov. 26, 1985    4,555,125
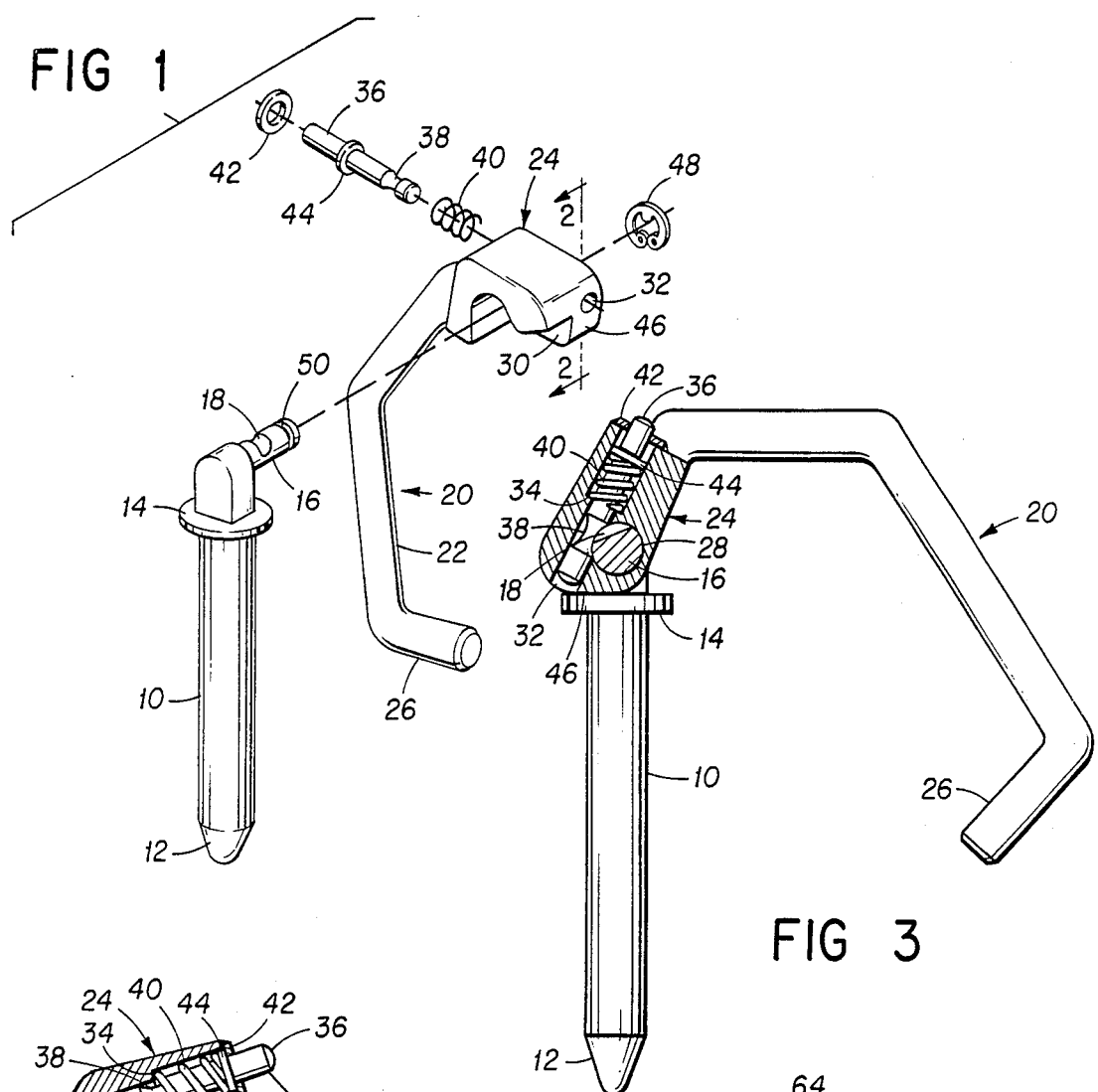
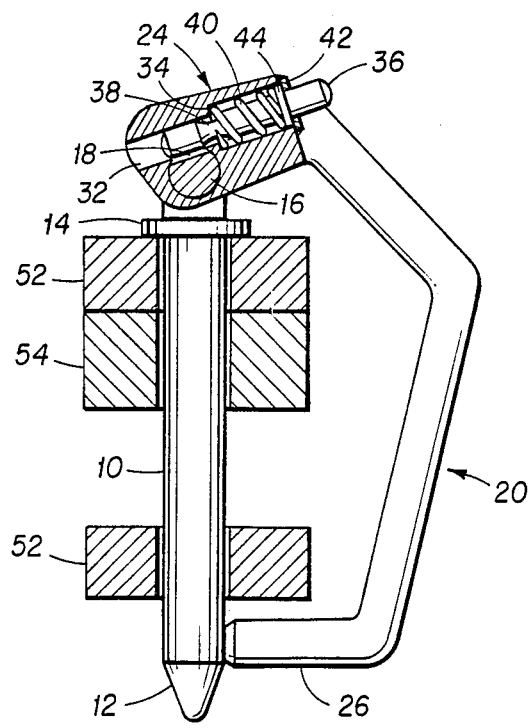
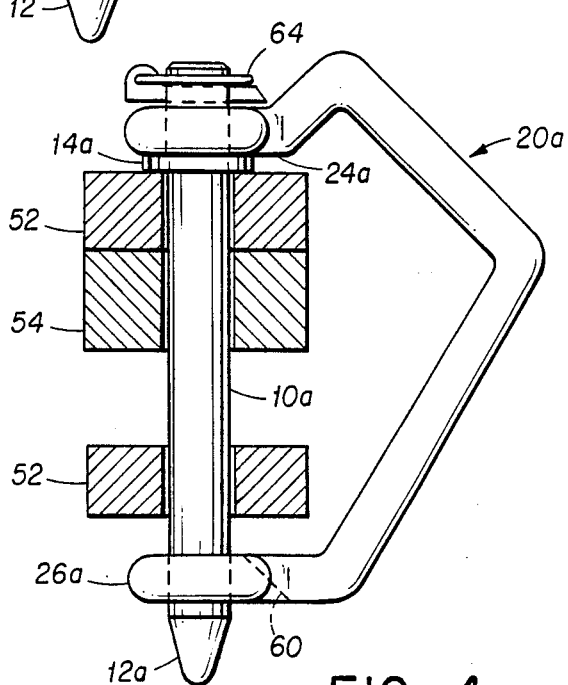

SAFETY HITCH PIN

BACKGROUND OF THE INVENTION

Hitch pins are commonly used to connect a drawn vehicle to the towing vehicle. For example, the farmer normally has a number of different implements which must be connected to the drawbar of a farm tractor. There are numerous designs of such pins for preventing the pin from inadvertently falling out from the drawbar. Obviously, if the pin inadvertently falls out and the towed trailer or implement becomes disconnected from the tractor, damage to the equipment or personal injury can result.

Pins have been designed which use a hasp that is inserted through an opening in the bottom of the pin after the connection is made. However, if the hasp is bumped or becomes caught on a cornstalk, for example, the hasp can be lost and the hitch pin can work its way out of the connection between the drawbar and the tongue of the drawn vehicle.

Some hitch pins are provided with a self-contained over-center wedge in the bottom end of the pin which wedge by force of gravity will pivot to a transverse position at the bottom of the pin thus preventing the pin from being withdrawn unless the wedge is manually moved into an upright position. However, through use, the wedge can bounce back into the pin or it can become bent and, therefore, fail to drop into a locking position.

Other hitch pins have used wire spring yokes or chain yokes some with catches or padlocks. The wire spring yokes can become easily broken, particularly when used to provide extra leverage for removing a tight pin.

There is, therefore, a need for a simple, durable self-locking hitch pin which will positively prevent the pin from inadvertently falling out of the connected members. It is further desirable that such a pin provide a means for increasing the leverage for removing the pin since in most instances the drawbar and tongue are applying forces on the pin which makes it difficult to remove. Such a pin should also be simple to manufacture and relatively low in cost.

SUMMARY OF THE INVENTION

The improved safety-lock hitch pin of the invention includes a pin with a collar formed near its upper end and a transversely extending handle mounting member above the shoulder. The handle has a main body with a transversely extending opening through it to provide for pivotal mounting of the handle on the transverse member of the pin. A second opening in the main body of the handle contains a locking member biased into a locking position when the handle is lowered into a closed position with the lower end of the handle from a closed and locked position, the locking member is manually depressed which allows the handle to pivot upwardly so that the pin can be removed. In the unlocked position, the handle provides for additional leverage for removal of a tight pin.

A second embodiment has a handle with an elongated opening at its lower end that fits over the lower end of the pin. The upper end of the handle has a main body portion with a vertically extending opening that fits over the top end of the pin and rests upon the collar of the pin. A snap ring, pin or other locking device holds the handle in locked position on the pin. With the locking device in place, the handle provides for increased leverage for removing a tight pin.

BRIEF DESCRIPTION OF THE DRAWINGS

FIG. 1 is an exploded perspective view of a pin constructed according to the invention;

FIG. 2 is a side elevational view partly in section taken on the line 2—2 and showing the pin in a locked position;

FIG. 3 is a side elevational view partly in section similar to FIG. 2 but showing the pin in an unlocked position; and FIG. 4 is a side elevational view partly in section and showing a second embodiment of the invention.

DESCRIPTION OF THE PREFERRED EMBODIMENTS OF THE INVENTION

The components of the self-locking hitch pin of the invention are all shown in the exploded view of FIG. 1. The pin 10 has a conical shaped lower end 12 and a collar 14 formed near its upper end. The portion of pin 10 above collar 14 is preferably formed with flat vertical surfaces on two opposite sides as shown in FIG. 1, and extending transversely from the main body of pin 10 is a handle mounting member 16 which has a transverse groove 18 formed in its upper surface.

The handle, indicated generally by the reference numeral 20, has a hand gripping portion 22 and a main body 24 formed at the upper end of the hand gripping portion 22. The hand gripping portion 22 terminates in a lower portion 26 that engages the pin 10 when the handle 20 is in a locked position (see FIG. 2).

The main body 24 has an opening 28 running transversely through it, which opening 28 is slightly larger than the diameter of the handle mounting member 16. The main body 24 also is cut out to fit the upper end of pin 10, thus forming a shoulder 30 that engages the flat surface formed on the upper end of pin 10 above collar 14.

The main body 24 also has an opening 32 extending transversely to opening 28 and extending partially through opening 28. Opening 32 is counterbored (see FIGS. 2 and 3) so as to form a shoulder 34. A locking member 36 is received in opening 32, which locking member 36 has a circumferential groove 38 formed around it as best seen in FIG. 1.

Locking member 36 has a collar 44 and is slideable axially in opening 32 with a spring 40 compressed between collar 44 and shoulder 34 in the opening 32 so as to force member 36 to a locked position as shown in FIG. 2. A retaining ring 42 is secured in any suitable manner to main body 24 at the outer end of opening 32 to hold the locking member 36 in place. In the locked position, the end of locking member 36 is engaged in the groove 18 of the handle mounting member 16 thereby preventing the handle from being pivoted on the mounting member 16. However, if the locking member 36 is manually moved axially so that the groove 38 is in alignment with the mounting member 16, the handle 20 can be pivoted through a limited arc to an unlocked position as shown in FIG. 3. In the unlocked position, the front surface 46 of the main body 24 engages collar 14 of pin 10 to serve as a stop and also to provide additional leverage for removing the pin. To maintain the assembly of the handle 20 to the pin 10 a snap ring 48 is engageable in a groove 50 in the outer end of the handle mounting member 16.

In use, the operator will grasp the handle 20 and depress the locking member 36 so that the handle 20 can be pivoted relative to pin 10. The openings in the drawbar 52 are then aligned with the opening in the tongue 54 of the drawn vehicle and the pin 10 is inserted through the aligned openings. The handle 20 is then swung downwardly until its lower end 26 engages the main body of pin 10, and if the locking member 36 is released, spring 40 will bias the locking member 36 into a locked position as shown in FIG. 3. Normally, when the handle 20 is released, the weight of gravity and force of loaded spring will return the handle 20 to a locked position automatically. In the locked position, the pin 10 cannot be removed without depressing the locking member 36 to release the handle 20. Nor can the pin 10 inadvertently fall out. To remove the pin 10, the handle 20 is grasped by the user and the locking member 36 pressed inwardly. This releases the handle 20 from its locked position and permits the handle to be pivoted upwardly until the surface 46 engages collar 14 of the pin. In this position, the handle 20 provides for additional leverage to remove the pin if it is tightly engaged in the drawbar 52 and tongue 54.

FIG. 4 illustrates another embodiment of the invention which is a clevis-lock type pin. In this embodiment the pin 10a has a cone shaped lower end 12a and a collar 14a near its upper end. The handle 20a has a hand gripping portion 22a at the lower end 26a of which there is formed an elongated opening 60.

The upper end of handle 20a the main body 24a has a vertical opening extending through it which opening is slightly larger in diameter than the exterior diameter of the upper cylindrical end of pin 10a. A snap pin 64 or other removable locking member is combined with pin 10a at its uppermost end to prevent the handle 20a from being removed without removing the snap pin 64.

In use, the pin 10a is inserted through the aligned openings of the drawbar 52 and tongue 54. When so positioned, the lower end of pin 10a extends beneath the drawbar 52, and the collar 14a rests on top of the upper portion of drawbar 52. The elongated opening in the lower end 26a of handle 20a is then slipped over the lower end of pin 10a, and the handle 20a is then swung outwardly and upwardly until the opening in the main body 24a of pin 20a is in alignment with the upper end of pin 10a. The handle 20a is then lowered until the main body 24a rests on collar 14a at which time the snap pin 64 is locked in place. When it is desired to remove the hitch pin to disconnect the drawbar 52 from tongue 54, the foregoing procedure is reversed.

From the foregoing description of the embodiments of my invention, it will be evident that the invention provides a safety hitch pin which cannot inadvertently fall out during use. The invention provides a positive lock for the hitch pin while providing for a relatively simple structure. In addition, the invention provides a handle which can be gripped by the user to remove the hitch pin which frequently becomes difficult to remove because of the forces exerted on it by the drawbar and tongue connection. The invention therefore provides a hitch pin that is greatly improved over prior art hitch pins particularly from the safety angle, ease of use and durability. It will be evident to those skilled in the art that various revisions and modifications can be made to the embodiments shown and described in this application. It is my intention, however, that all such revisions and modifications to the preferred embodiments which are obvious to those skilled in the art will be included within the scope of the following claims.

What is claimed is:

1. A safety hitch pin for connecting a towing vehicle to a towed vehicle, said hitch pin comprising a pin having a collar near its upper end, a handle mounting member extending transversely of the upper end of said pin above the collar and having a transverse opening formed therein, a handle having an enlarged portion at its upper end mounted on said mounting member for pivotal movement from an upper unlocked position to a lower locked position, the enlarged portion of the handle having an opening therein extending transversely to the mounting member, the handle being formed so that its lower end engages the pin near the lower end of the pin when the handle is in the lower locked position, a manually-operated positive-locking member combined with the upper end of the handle and moveable within the opening in said handle into and out of the opening in the handle mounting member so as to maintain the handle in its lower locked position until manually unlocked, and means to normally maintain the handle and pin in assembled condition.

2. The safety hitch pin of claim 1 in which the opening formed in the handle mounting member is a groove in its upper surface, the opening in the enlarged portion is in alignment with said groove, and a spring biases the locking member into the groove to maintain the handle in a locked position until the locking member is manually moved against the force of the spring.

3. The safety hitch pin of claim 1 in which the enlarged portion of the handle engages the collar on the pin when the handle is pivoted upwardly to an unlocked position, thereby providing a stop and to assist in removing the pin.

4. A safety hitch pin for connecting a towing vehicle to a towed vehicle, said hitch pin comprising a pin having a collar near its upper end, a handle engageable with the upper end of the pin above the collar, the handle being formed so that its lower end engages the pin near its lower end when the handle is in the lower locked position, the handle having an enlarged portion at its upper end with a vertical opening extending therethrough and an enlarged portion at its lower end with an opening therethrough that provides for swinging of the top of the handle outwardly in the plane of the pin, and a manually operable locking member combined with the upper end of the pin and the upper end of the handle to maintain the handle in its lower locked position until manually released, a portion of the upper end of the handle being engageable with the collar to limit movement of the handle relative to the pin and to assist in removing the pin.

* * * * *